(12) United States Patent
Cox et al.

(10) Patent No.: US 9,056,413 B1
(45) Date of Patent: Jun. 16, 2015

(54) METHOD AND PORTABLE STATION FOR LAYING UP AND CURING COMPOSITE RESIN PARTS

(75) Inventors: Gordon M. Cox, Issaquah, WA (US); Steven L. Abberger, Puyallup, WA (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 13/491,278

(22) Filed: Jun. 7, 2012

(51) Int. Cl.
*B29C 33/02* (2006.01)
*B29C 35/02* (2006.01)
*B29C 43/36* (2006.01)

(52) U.S. Cl.
CPC .................. *B29C 43/36* (2013.01); *B29C 35/02* (2013.01); *B29C 2035/0211* (2013.01)

(58) Field of Classification Search
CPC ............ B29C 2035/0211; B29C 70/54; B29C 2043/3665; B29C 2043/3615; B29C 33/34; B29C 2033/042
USPC .......................................... 425/507, 508, 152
See application file for complete search history.

(56) References Cited

U.S. PATENT DOCUMENTS

| | | | | | |
|---|---|---|---|---|---|
| 1,556,491 | A | * | 10/1925 | Clark | 392/378 |
| 1,581,386 | A | * | 4/1926 | Clark | 122/4 A |
| 1,662,935 | A | * | 3/1928 | Odell | 392/378 |
| 1,728,309 | A | * | 9/1929 | Shreeve et al. | 392/378 |
| 1,853,420 | A | * | 4/1932 | Harris | 261/128 |
| 2,498,145 | A | * | 2/1950 | Tinker | 165/159 |
| 2,689,372 | A | * | 9/1954 | Goulding, Jr. et al. | 425/384 |
| 3,798,998 | A | * | 3/1974 | Connors et al. | 74/612 |
| 3,868,825 | A | * | 3/1975 | Boyce | 405/131 |
| 4,788,412 | A | | 11/1988 | Hori et al. | |
| 4,972,766 | A | * | 11/1990 | Anetsberger | 99/332 |
| 6,455,817 | B1 | | 9/2002 | Guzzi et al. | |
| 6,991,449 | B1 | * | 1/2006 | Mead et al. | 425/389 |
| 2009/0011063 | A1 | * | 1/2009 | Davie et al. | 425/144 |
| 2010/0006739 | A1 | | 1/2010 | Robins et al. | |
| 2010/0009124 | A1 | | 1/2010 | Robins et al. | |
| 2010/0224310 | A1 | | 9/2010 | Jones | |
| 2011/0014315 | A1 | * | 1/2011 | Okoli et al. | 425/405.1 |

FOREIGN PATENT DOCUMENTS

WO WO2008118221 A2 10/2008
WO WO2010005811 A1 1/2010

* cited by examiner

*Primary Examiner* — Matthew Daniels
(74) *Attorney, Agent, or Firm* — Yee & Associates, P.C.

(57) ABSTRACT

A composite resin part is fabricated by laying up a composite part on the mandrel mounted on a portable cart. The cart is used to transport the part layup as it is being cured by a heating and air circulation system on-board the cart.

16 Claims, 10 Drawing Sheets

METHOD AND PORTABLE STATION FOR LAYING UP AND CURING COMPOSITE RESIN PARTS

BACKGROUND INFORMATION

1. Field

The present disclosure generally relates to the fabrication of composite resin parts, and deals more particularly with a method and portable station for laying up and curing composite resin parts.

2. Background

Fiber reinforced composite resin parts may be fabricated by laying up multiple plies of prepreg on a layup mandrel. The part layup is then subjected to a combination of heat and pressure. Curing may be performed within an autoclave, however autoclave curing may be time consuming, and requires large and expensive equipment. In order to avoid the need for autoclave processing and improve production flow times, out-of-autoclave curing may be possible for some part applications using a conventional oven and vacuum bagging. However, out-of-autoclave oven curing may nevertheless require use of a stationary oven and may require special equipment and/or tooling for loading and unloading the part. Also, since the oven is stationary, time may be spent in transporting the part layup between other fabrication or assembly stations and the oven, thus adding to manufacturing flow time. Both autoclaves and oven limit mobility of the fabrication process.

Accordingly, there is a need for a method and apparatus for curing a composite part layup that does not require an autoclave or an oven for thermal curing. There is also a need for a lean, just-in-time, composite part layup curing method and portable curing station that may decrease manufacturing flow time.

SUMMARY

The disclosed embodiments provide a portable curing station and related method that allow layup and curing of a composite resin part using stand-alone, self-heating tooling. The portable curing station allows composite part layups to be individually cured on a layup mandrel mounted on a movable cart having integrated heating, thereby better facilitating continuous manufacturing flow. Use of the portable curing station allows a layup mandrel to be transported to a dedicated layup location in a factory, which may include an automated fiber placement (AFP) machine, where multiple plies of prepreg may be laid up on the mandrel. The portable curing station may then be used to transport the part layup on the mandrel to another factory location where curing or other next-in-line processes may be carried out, such as trimming or assembly. The disclosed method and portable curing station may eliminate the need for large, expensive and/or stationary capital equipment, such as autoclaves and ovens. Labor costs and manufacturing flow times may also be reduced.

According to one disclosed embodiment, a portable curing station is provided, comprising a movable cart, a mandrel on the movable cart for supporting a composite resin part layup thereon, and a heating system on the movable cart for heating the mandrel. The portable curing station may further comprise a programmed controller on the movable cart for automatically controlling the heating system. The heating system may include at least two heating zones separately controllable by the programmed controller. The portable curing station may also comprise an air circulation system on the movable cart and controlled by the programmed controller for circulating air through the mandrel. The movable cart includes a base, and the mandrel is removably mounted on the base. The mandrel includes a substantially open interior, and the movable cart includes a mounting plate. The heating system includes electric heating elements mounted on the mounting plate and disposed within the open interior of the mandrel. The air circulation system includes a baffle system inside the mandrel for channeling air flow through the mandrel, and at least one air blower for forcing airflow through the mandrel. A vacuum system on board the cart may be used to compact the part layup while on the mandrel. The portable curing station may also comprise at least one shield on the movable cart, the shield being movable from a standby position allowing access to the mandrel, to an operative position shielding the mandrel against access, and an interlock on the movable cart for sensing the position of the shield and for delivering a signal to the programmed controller indicative of the position of the shield.

According to another embodiment, apparatus is provided for fabricating a composite resin part. The apparatus comprises a movable cart, a mandrel on which composite resin plies may be laid up and cured, the mandrel being mounted on the movable cart, and a heating system on the movable cart for heating the mandrel. The apparatus further comprises an air circulation system on the movable cart for circulating air through the mandrel, and a programmed controller for automatically controlling the operation of the heating system and the air circulation system. The movable cart includes a set of wheels allowing rolling movement of the movable cart over a floor. The mandrel includes a tool shell having a substantially open interior, and a tool base on which the tool shell is removably mounted. The heating system includes electric heating elements mounted on the base and disposed within the open interior of the tool shell. The mandrel includes baffle plates forming air flow channels within the open interior of the tool shell for channeling a flow of air through the open interior of the tool shell. The heating system includes electric heating elements disposed within the air flow channels. The mandrel includes a substantially open interior though which air may flow. The air circulation system includes at least one air blower, an air supply duct coupled between the air blower and the mandrel for supplying air to the open interior of the mandrel, and an air return duct coupled between the air blower and the mandrel for returning air from the open interior of the mandrel to the blower. A vacuum system on board the movable cart may be used to compact the part layup while on the mandrel.

According to a further embodiment, a method is provided of fabricating a composite resin part, comprising placing a mandrel on a cart, assembling a composite resin part layup on the mandrel, using the cart to transport the part layup, and curing the part layup on the mandrel while the mandrel is on the cart. Curing the part layup includes heating the interior of the mandrel, and passing air through the interior of the mandrel. Heating the interior of the mandrel is performed using an electrical heating system on the cart, and passing air through the interior of the mandrel is performed using an air circulation system on the cart. The part layup may be compacted while on the cart. Curing the part layup may be performed while the part is being transported on the cart. Assembling the part layup includes layup composite resin plies on the mandrel at a first fabrication location, curing the part layup is performed at a second fabrication location, and using the cart to transport the part layup includes transporting the part layup on the cart from the first location to the second location.

According to still another embodiment, a method is provided of fabricating a composite resin part, comprising placing a layup mandrel on a cart, laying up a composite part on the layup mandrel, and curing the composite part while the composite part is on the layup mandrel and the layup mandrel is on the cart. Laying up the composite part is performed at a first location, and the method further includes using the cart to transport the composite part to a second location. Laying up the composite part may be performed using an automated fiber placement machine. The composite part may be compacted on the layup mandrel. Curing the composite part includes heating the mandrel using a heating system on-board the cart, and controlling temperatures to which the mandrel is heated using a programmed controller on-board the cart.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
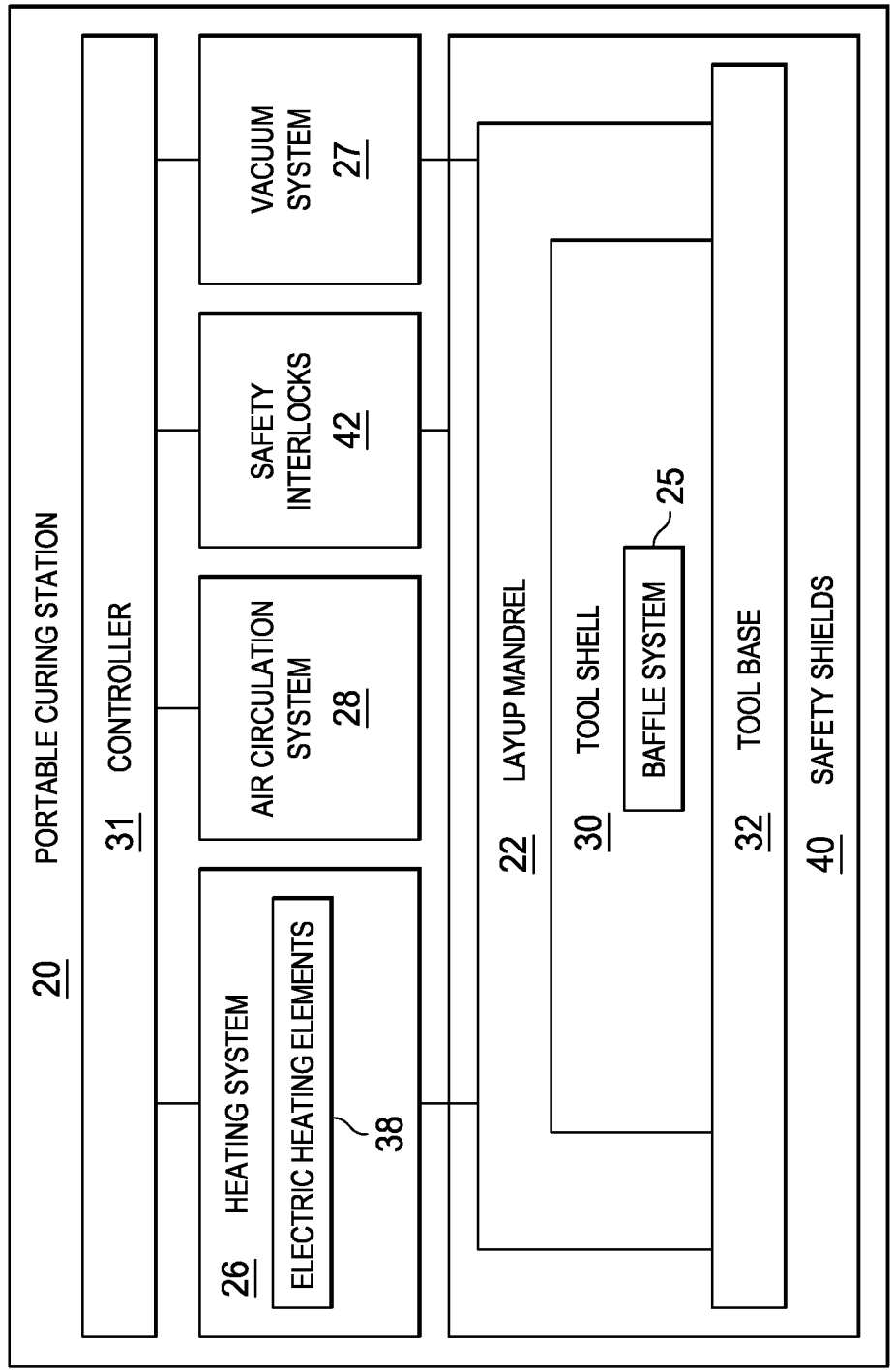
FIG. 1 is an illustration of a functional block diagram of a portable curing station.

Referring first to FIG. 1, a portable curing station 20 may be used to layup, transport and cure a composite resin layup (not shown). The portable curing station 20 allows portable curing of a composite part layup with or without autoclave processing. The portable curing station 20 broadly comprises a layup mandrel 22, a heating system 26, an air circulation system 28 and a programmed controller 31. The programmed controller 31 may comprise, without limitation, a programmable logic controller (PLC), or a personal computer (PC), which functions to automatically control the operation of the heating system 26 and the air circulation system 28. The layup mandrel 22 broadly comprises a tool shell 30 removably mounted on a tool base 32. The tool shell 30 includes an internal baffle system 25 that controls the flow path of air circulated through the tool shell 30 by the air circulation system 28.

The heating system 26 comprises electric heating elements 38 which internally heat the layup mandrel 22 to temperatures determined by the programmed controller 31. An on-board vacuum system 27 operated by the controller 31 may be used in combination with a compaction device such as a vacuum bag (not shown in FIG. 1) to compact the part layup prior to curing. The portable curing station 20 may optionally include safety shields 40 which may be moved into place around the layup mandrel 22 in order to provide a safety barrier to prevent objects from coming into contact with the heated mandrel 22. Safety interlocks 42 may be provided between the controller 31 and the safety shields 40 to prevent heating of the layup mandrel 22 unless the safety shields have been moved into place around the layup mandrel 22.

Figure 2:
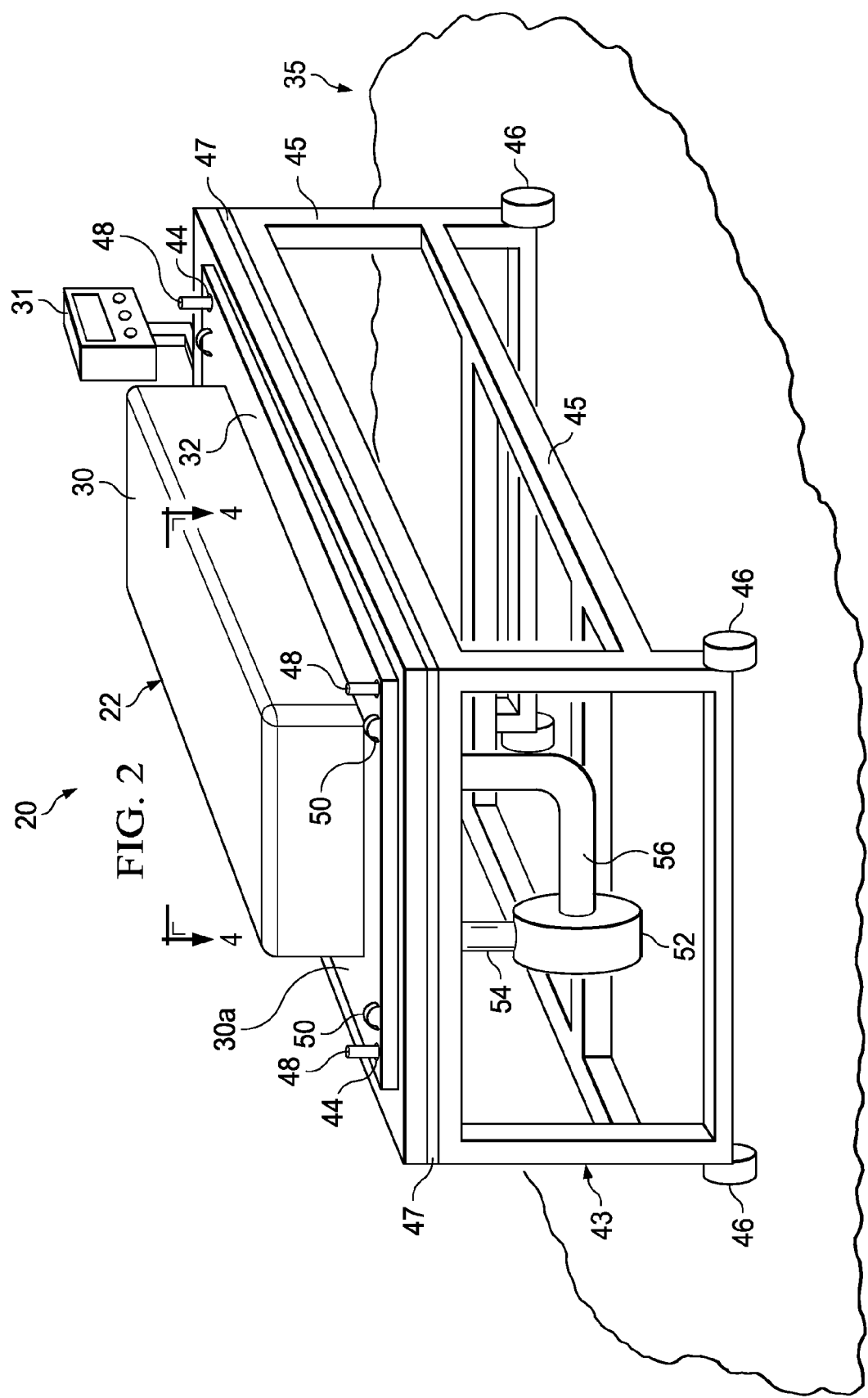
FIG. 2 is an illustration of a perspective view of one embodiment of the portable curing station shown in FIG. 1.

FIG. 2 illustrates one typical embodiment of the portable curing station 20 shown in FIG. 1. The portable curing station 20 broadly comprises a movable cart 43 having a rigid frame 45 provided with wheels 46 that allow the movable cart 43 to be pushed or pulled across a factory floor 35. An internally heated layup mandrel 22 is mounted on a substantially flat tool base 32 supported on the rigid frame 45. A layer of thermal insulation 47 may be provided between the tool base 32 and the frame 45 in order to prevent the frame 45 from being heated during a thermal cure cycle. As will be discussed below in more detail, an air circulation system (FIG. 1) includes one or more blowers 52 which circulate air internally through the tool shell 30 using an air supply duct 54 and an air return duct 56 to re-circulate air between the tool shell 30 and the blowers 52.

The tool shell 30 includes a peripheral flange 30a which is supported on the tool base 32 and is provided with one or more indexing openings 44 adapted to receive indexing dowels or pins 48 on tool base 32. The peripheral flange 30a forms a surface surrounding the tool shell 30 to which a vacuum bag (not shown) or other part layup compaction device may be sealed. The indexing pins 48 removably hold the tool shell 30 in an indexed position on the tool base 32, but allow the tool shell 30 to be lifted away and removed from the tool base 32 for cleaning, repair or exchanged with a different tool shell 30. This mounting arrangement also allows interchangeability between tool shells 30 having slightly different outside geometries. Lifting rings 50 may be provided on the flange 30a to allow lifting equipment such as a crane (not shown) to lift the tool shell 30 away from the movable cart 43. The programmable controller 31 may be mounted on the movable cart 43, and is thus moveable along with the layup mandrel 22 between various locations on the factory floor 35. Although not shown in FIG. 2, power cords or data lines may be coupled with the movable cart 43 to supply electrical power to the heating system 26 (FIG. 1) and the controller 31, and to allow data communication with factory data systems (not shown).

Figure 3:
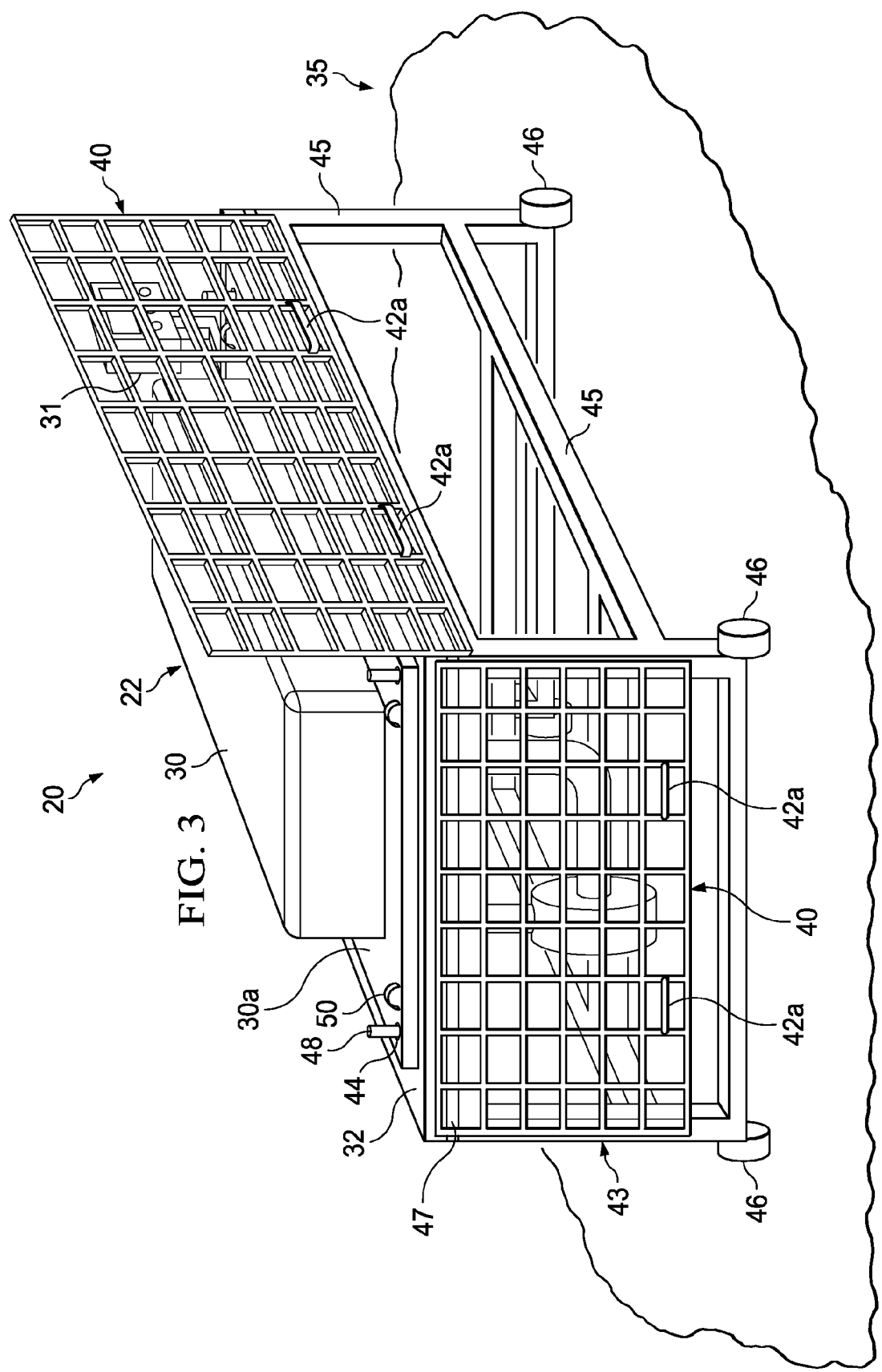
FIG. 3 is an illustration similar to FIG. 2 but showing use of safety shields, one of the safety shields being shown in its operative, raised position.

Referring now to FIG. 3, in order to protect object and personnel from coming into contact with layup mandrel 22 when heated, safety shields 40 may be installed on the sides of the movable cart 43. The safety shields 40 may be attached to the movable cart 43 using any suitable means that allow them to slide or pivot between a lowered, standby position allowing access to the layup mandrel 22, and a raised, operative position forming a barrier around the heated layup mandrel 22. One of the safety shields 40 may be provided on each side of the movable cart 43, so that the entire perimeter of the layup mandrel 22 is shielded. Each of the shields 40 may comprise any suitable barrier material such as wire grid as shown in the illustrated embodiment. Each of the shields 40 may be provided with handles 42a to allow the safety shields to be manually manipulated by an operator between raised and lowered positions.

Although not shown in FIG. 3 but illustrated in FIG. 1, electrical safety interlocks 42 may be provided on the movable cart 43 which are connected with each of the safety shields 40. The safety interlocks 42 may comprise conventional electrical switches or non-contact sensors that sense the position of the safety shields 40 and provide interlock signals to the programmable controller 31. The programmable controller 31 may be programmed to respond to the receipt of an interlock signal by preventing start up of the heating system 26 until the safety shields 40 are moved to their raised positions.

Figure 4:
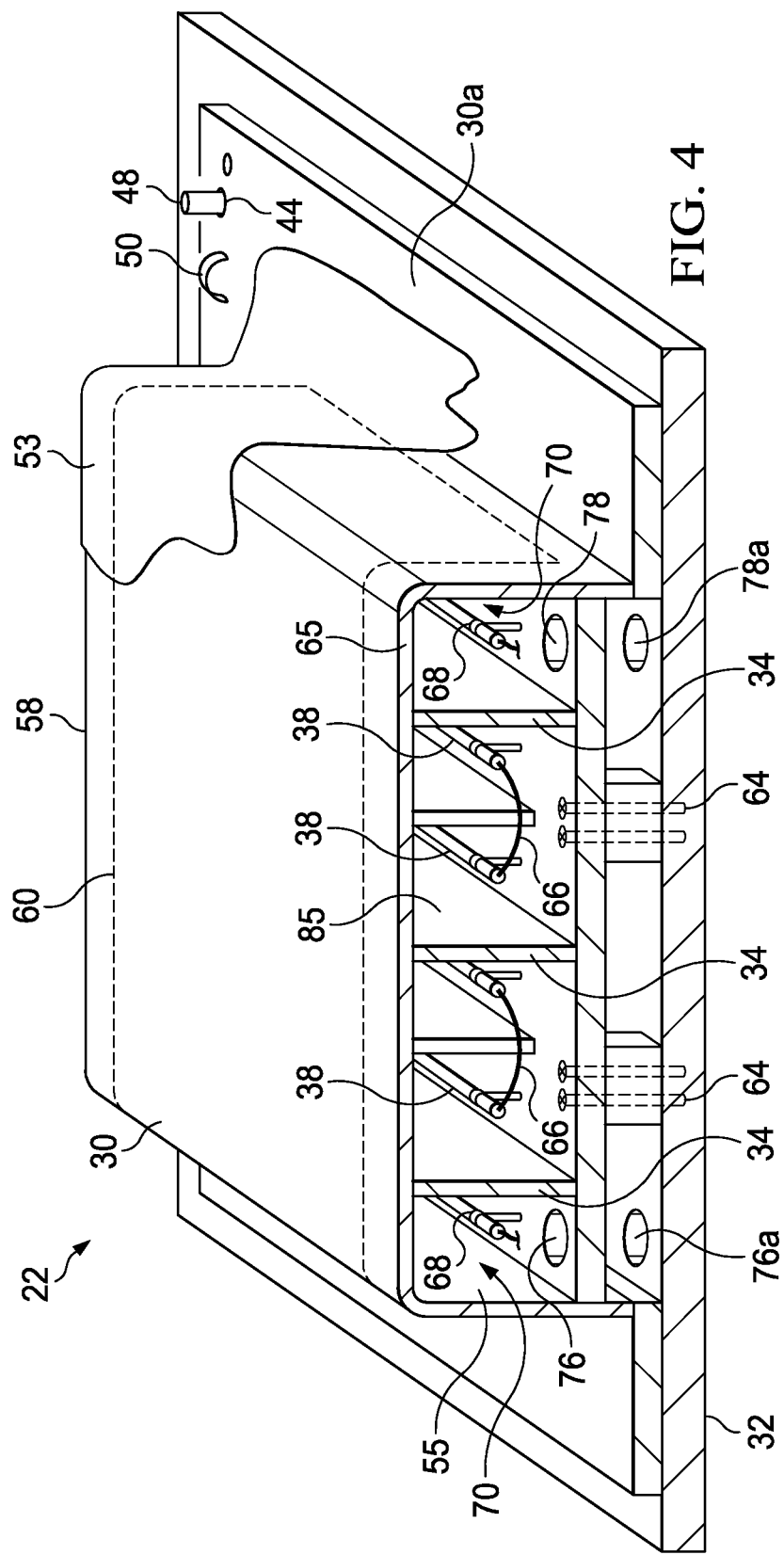
FIG. 4 is an illustration of a cross sectional, perspective view of a layup mandrel which forms part of the portable curing station shown in FIGS. 1-3.
Figure 5:
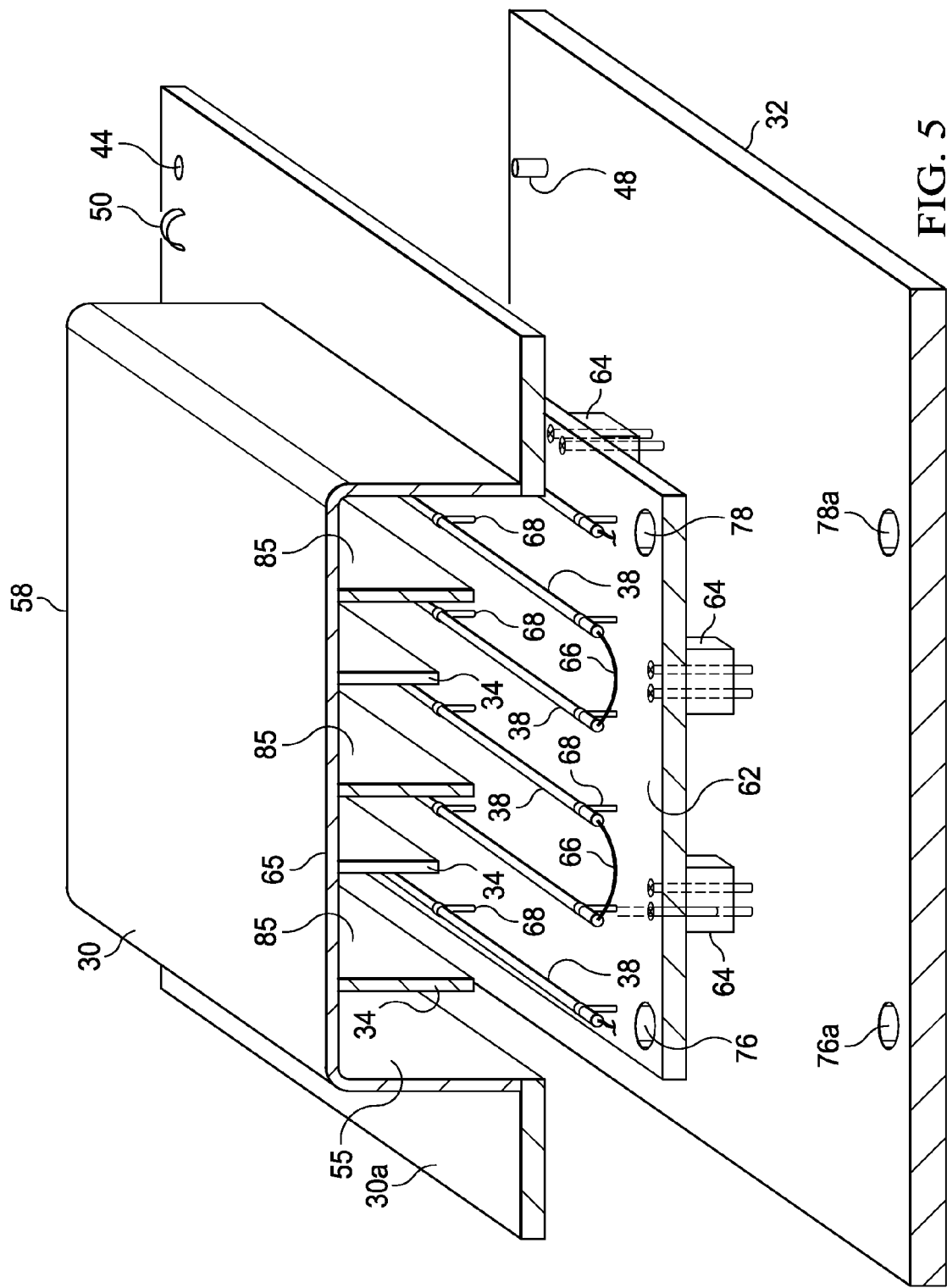
FIG. 5 is an illustration similar to FIG. 4 but showing the tool shell partially lifted away from the mandrel base in order to better reveal internal components of the layup mandrel.

Attention is now directed to FIGS. 4 and 5 which illustrate additional details of the layup mandrel 22. In this example, the tool shell 30 has a tool face that is generally U-shaped in cross section and is adapted to have fiber reinforced composite resin plies laid up thereon forming a part layup represented by the broken line 60. A compaction device such as, without limitation, a flexible vacuum bag 53 (FIG. 4), may be installed on the mandrel 22 covering the part layup 60 to compact the part layup 60 prior to and/or during curing in order to reduce part porosities and increase the ratio of fiber volume of the part layup 60. The vacuum bag 53 may be coupled with the on-board vacuum system 27 (FIG. 1) and sealed to the peripheral flange 30a using conventional sealing tape or other sealing methods (not shown). Also, although not illustrated in the drawings, one or more breathers, peel plies, caul plates, etc. may be placed over the part layup 60 beneath the vacuum bag 53. Alternatively, the vacuum bag 53 may be coupled with a vacuum system that is located off-board the cart movable cart 43. It should be noted here that while the tool shell 30 shown in FIGS. 2-5 is suitable for forming a generally U-shaped, elongate part such as a stiffener, other tool shell geometries are possible, depending on the shape of the composite part being fabricated. The tool shell 30 may be manufactured of any suitable wear resistant, thermally conductive material including but not limited to a metal such as Invar®.

The tool shell 30 has a substantially open interior 55. A mounting plate 62 is supported by spacers on tool base 32 within the open interior 55 of the tool shell 30. The mounting plate 62 includes a pair of air inlet openings 76, 78 that are respectively aligned with through holes 76a, 78a in the tool base 32. The through holes 76a, 78a in the tool base 32 are coupled with blowers 52 (FIG. 2) which supply air flow through the layup mandrel 22. Although not shown in the drawings, the through holes 76a, 78a are respectively connected with the air inlet openings 76, 78 by tubes or other means so that air entering the layup mandrel 22 by way of the through holes 76a, 78a flows directly to the air inlet openings 76, 78 and then into the open interior of the tool shell 30. Later discussed air outlet openings 80, 82 (FIG. 8) in the layup mandrel 22 allow air to exit from the open interior 55 of the layup mandrel 22.

The open interior 55 of the tool shell 30 is divided by internal baffle plates 34 into serpentine airflow channels 70 discussed below in more detail. The baffle plates 34 form the baffle system 25 shown in FIG. 1. Baffle plates 34 may be made of any suitable material, and in the illustrated example, comprise metal plates attached as by welding to the inside top surface of the tool shell 30. The baffle plates 34 may be attached to the top surface 65 of the tool shell 30 using other means, or may be formed integral with the tool shell 30. The baffle plates 34 extend substantially the full height between the inside top surface 65 of the tool shell and the mounting plate 62. Electric heating elements 38, which may comprise resistive heating elements, respectively span substantially the entire length of each of the airflow channels 70, and are mounted on the mounting plate 62 using standoffs 68 which may comprise an electrically insulated material that electrically insulate the heating elements 38 from the mounting plate 62. The heating elements 38 are connected in series with each other at their ends by electrical connecting wires 66, and although not shown in the Figures, the heating elements 38 are coupled with a suitable electrical power source. As shown in FIG. 5, when the tool shell 30 is removed from the tool base 32, the mounting plate 62 along with the heating elements 38 remain fixed on the movable cart 43, and the baffle plates 34 remain fixed to the tool shell 30.

Figure 6:
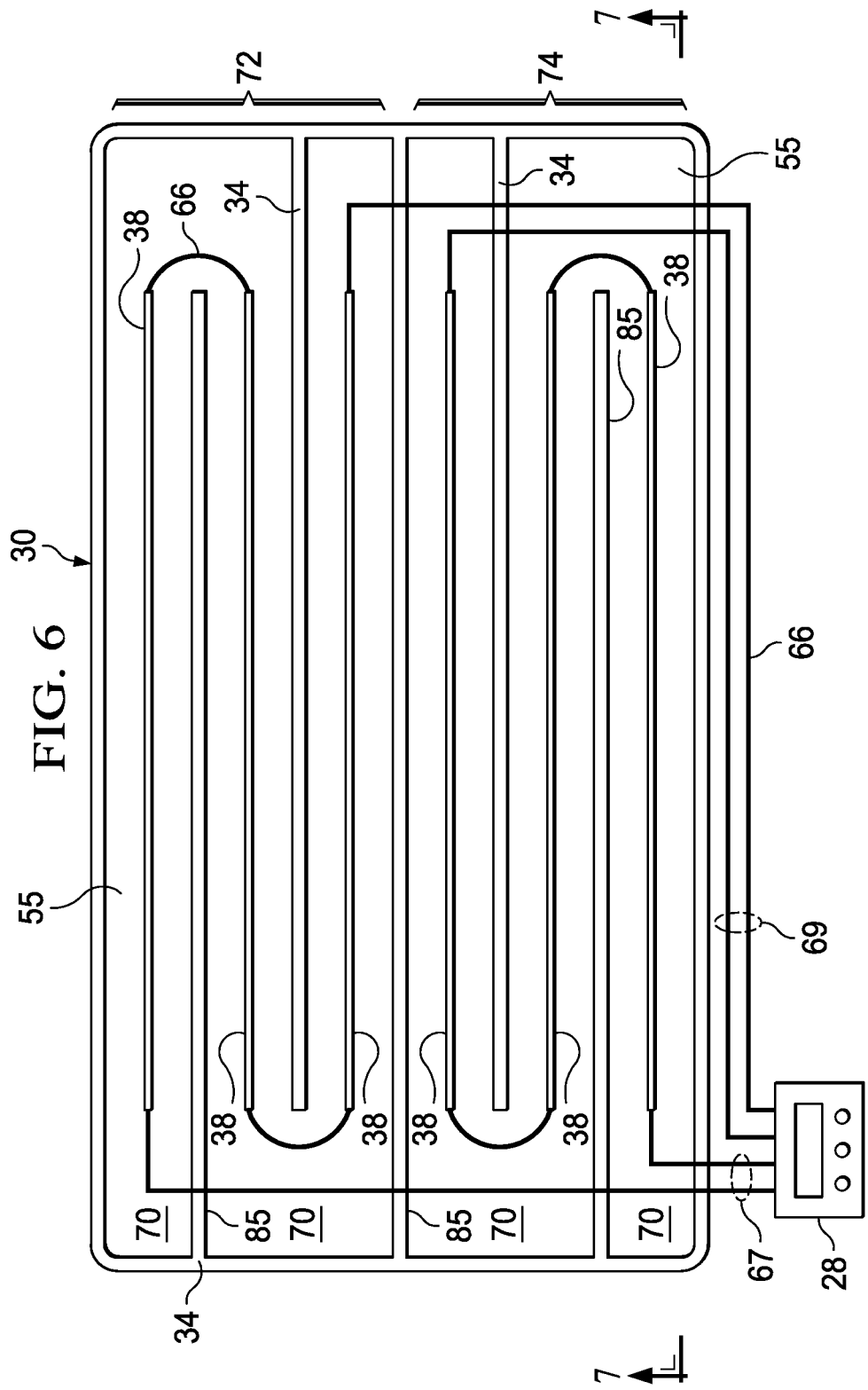
FIG. 6 is an illustration of sectional view taken along the line 6-6 in FIG. 2.
Figure 7:
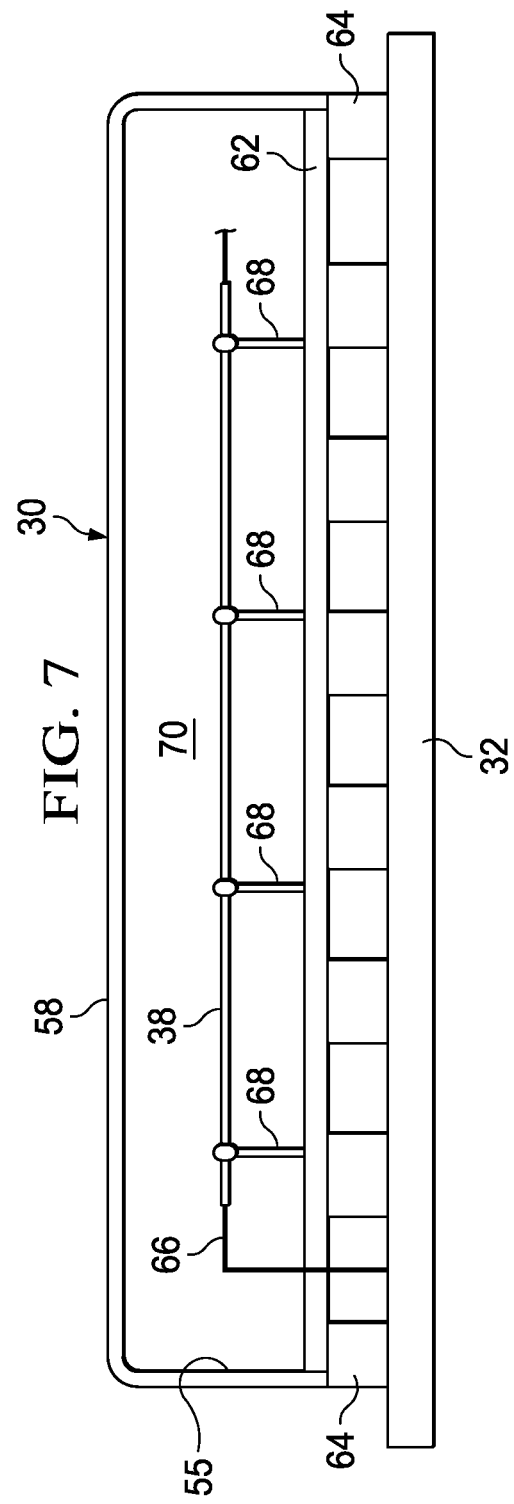
FIG. 7 is an illustration of a sectional view taken along the line 7-7 in FIG. 6.

FIGS. 6 and 7 which show one arrangement for the heating elements 38 and the baffle plates 34 that divide the layup mandrel 22 into two, generally equal sized heating zones 72, 74, respectively, which in the illustrated embodiment, are of substantially equal areas. In this embodiment, a central one of the baffle plates 34 acts as a partition wall 85 that divides the interior open area 55 of the tool shell 30 into the two, generally equal, adjacent heating zones 72, 74. In other embodiments, the mandrel 22 may have only a single heating zone, while in still other embodiments, more than two heating zones may be provided in order to achieve the desired control of temperature uniformity or profile over the tool face 58 of the tool shell 30. As best seen in FIG. 6, the heating elements 38 are arranged in two series circuits 67, 69 that are connected in parallel with each other and with the programmable controller 31, allowing the two heating zones 72, 74 may be individually controlled.

Figure 8:
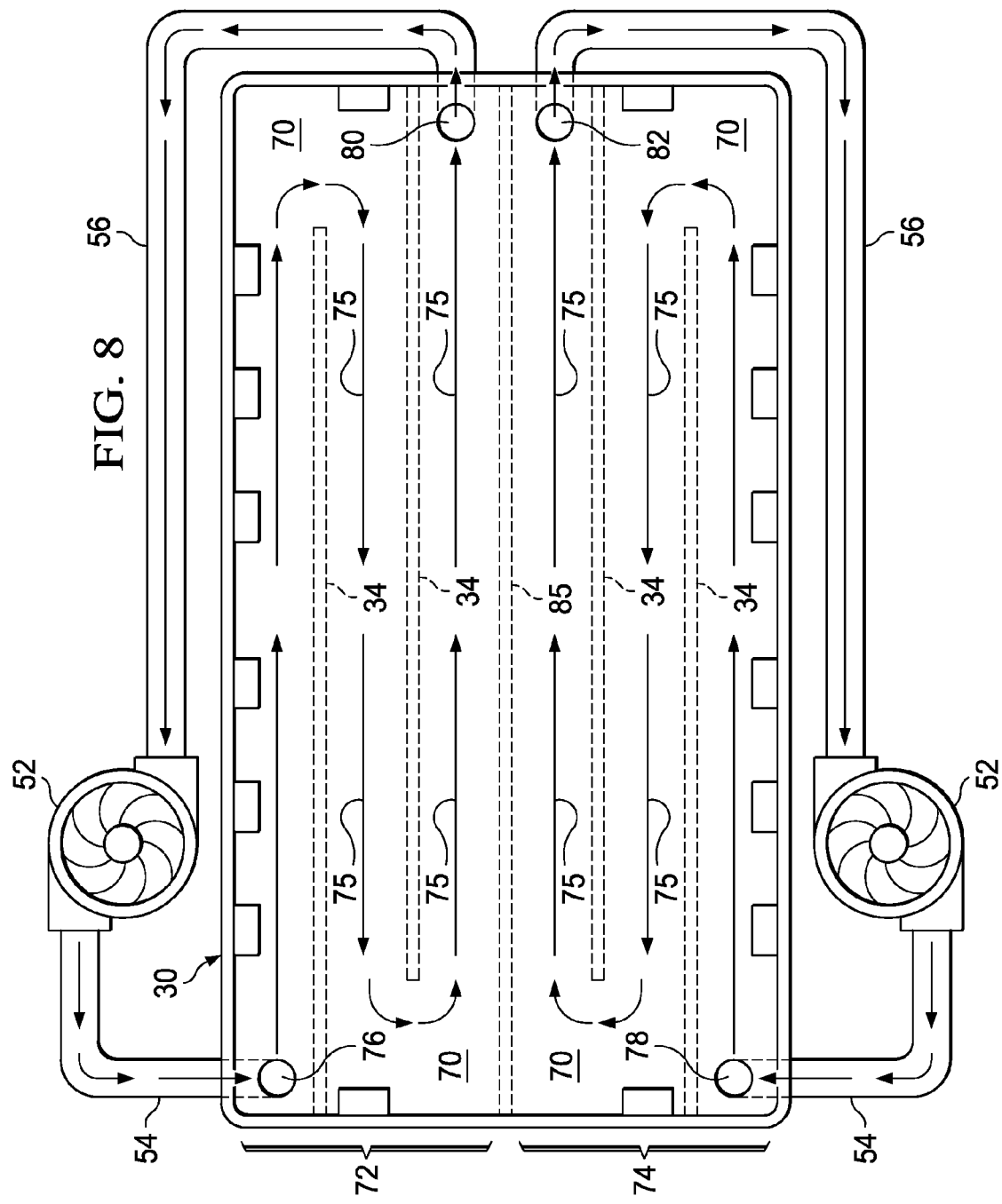
FIG. 8 is an illustration of a top view of the layup mandrel, diagrammatically illustrating the air circulation system and airflow paths.

Referring now to FIG. 8, the independent heating zones 72, 74 are formed by a central partition wall 85 which extends the full length of the tool shell and separates the tool shell 30 in to two substantially equal volumes. In other embodiments, the two heating zones 72, 74 may not have equal volumes, and as previously mentioned, more than two heating zones may be provided. Each of the independent heating zones 72, 74 has a serpentine airflow channel 70 that is determined by the location of the baffle plates 34. As indicated by the arrows 75, air flows from the blowers 52 through air supply ducts 54 to air inlet openings 76, 78. Air entering through the air inlet openings 76, 78 then flows through the air flow channels 70 between the baffle plates 34 to air outlet openings 80, 82 in the layup mandrel 2. The air exiting the layup mandrel 22 through the air outlet openings 80, 82 is directed by return air ducts to the blowers 52. Thus, air is continuously recirculated through the layup mandrel 22 during the curing process to assist in evenly distributing the heat generated by the heating elements 38 (FIGS. 6 and 7). The temperature of the layup mandrel 22 in each of the heating zones 72, 74 may be independently controlled, as required, by using the programmed controller to control the amount of electrical current supplied to the heating elements in the two zones 72, 74 and/or to independently control the speeds of the blowers 52.

In use, after the safety shields 40 have been raised to their operative position, and the controller 31 has been programmed with a suitable program, the controller 31 may initiate an automatic cure cycle in which the layup mandrel 22 is heated to temperatures with the desired temperature profile over time.

Figure 9:
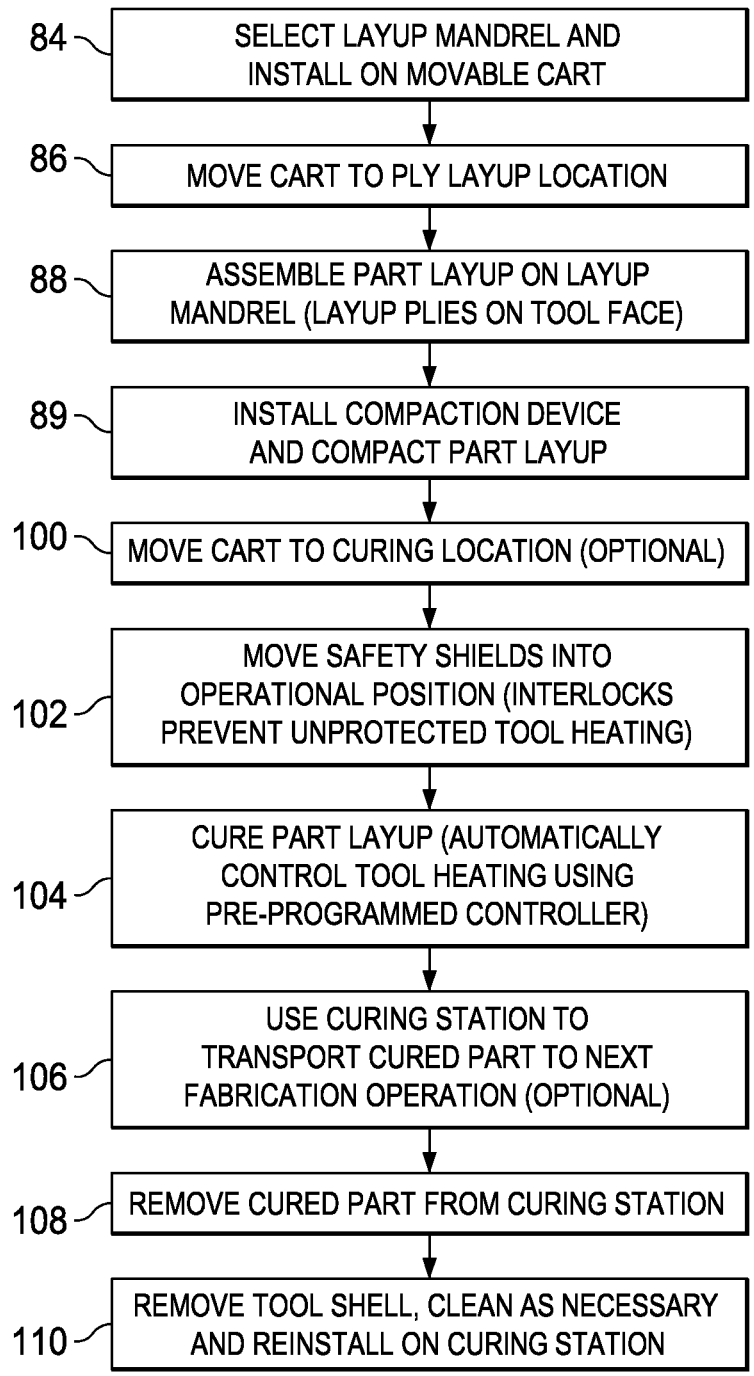
FIG. 9 is an illustration of a flow diagram of a method of laying up and curing a composite part using the portable curing station.

Attention is now directed to FIG. 9 which illustrates the overall steps of a method of laying up and curing a composite resin part layup 60. Beginning at 84, a suitable layup mandrel 22 is selected and installed on the movable cart 43 forming part of the portable curing station 20. At 86, the movable cart 43, with the layup mandrel 22 installed thereon may be moved to a ply layup location, such as in the vicinity of an automatic fiber placement (AFP) machine, where at step 88, composite resin plies are laid up on the layup mandrel 22, using the AFP machine or by using hand techniques. At step 89, a suitable compaction device, such as a vacuum bag 53 is installed and the part layup 60 is compacted. Before, during or after the part layup 60 has been compacted, the movable cart 43 may be moved to another location, optionally, where curing is performed, as shown at step 100. The curing may be carried out in an area dedicated to curing parts, or to the next in line fabrication station, such as, for example and without limitation, at a station where the cured part layup is to be trimmed and/or inspected. At 102, in preparation for a cure cycle, the safety shields 40 are moved into their raised operational position, resulting in the safety interlocks 42 being activated to enable initiation of a cure cycle. At step 104, the programmed controller 31 energizes the electric heating elements 38, and activates the blowers 52 to heat the tool shell 30, and thus the part layup to its cure temperature.

Air circulating through the airflow channels 70 and driven by the blowers 52, assists in evenly distributing the heat through the tool shell. The blowers 52 may also be used to cool down the tool shell at a desired rate at the end of a cure cycle, when the heating elements 38 have been de-energized. Following curing, the portable curing station 20 can be used to transport the cured part to an assembly location or other location where the next production operation is to be performed. At 108, the cured part is removed from the curing station 20. Optionally, as shown at 110, the tool shell 30 may be periodically removed from the movable cart 43 in order to clean, repair or replace it, as required.

Figure 10:
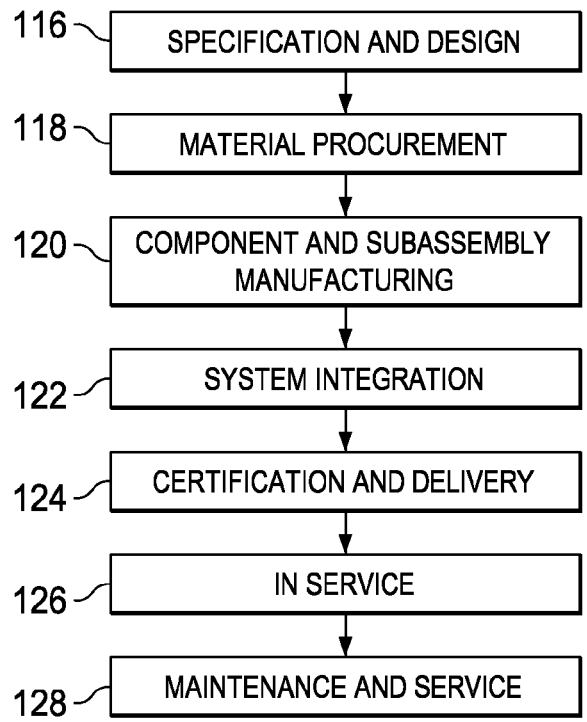
FIG. 10 is an illustration of a flow diagram of aircraft production and service methodology.
Figure 11:
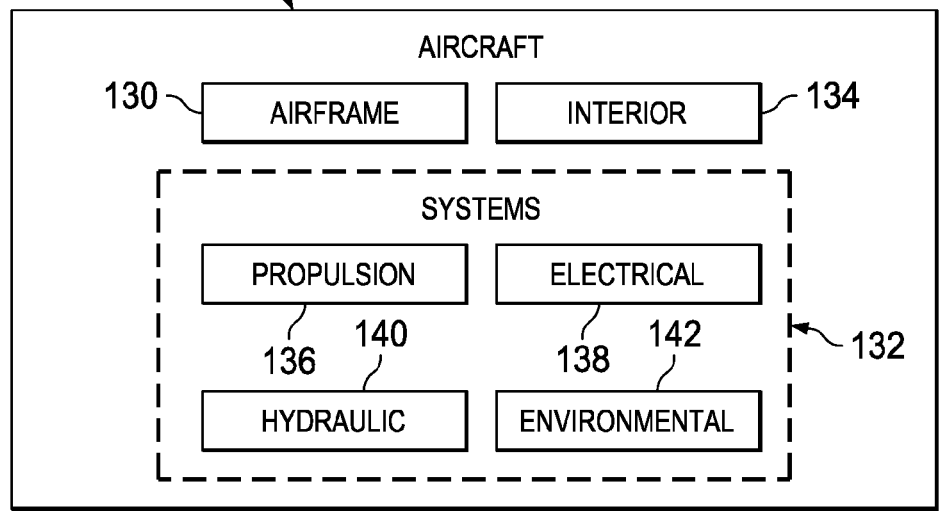
FIG. 11 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 10 and 11, embodiments of the disclosure may be used in the context of an aircraft manufacturing and service method 112 as shown in FIG. 10 and an aircraft 114 as shown in FIG. 11. Aircraft applications of the disclosed embodiments may include, for example, without limitation, layup of stiffener members such as, without limitation beams, spars and stringers, to name only a few. During pre-production, exemplary method 112 may include specification and design 116 of the aircraft 114 and material procurement 118. During production, component and subassembly manufacturing 120 and system integration 122 of the aircraft 114 takes place. Thereafter, the aircraft 114 may go through certification and delivery 124 in order to be placed in service 126. While in service by a customer, the aircraft 114 is scheduled for routine maintenance and service 128, which may also include modification, reconfiguration, refurbishment, and so on.

Each of the processes of method 112 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 114 produced by exemplary method 112 may include an airframe 130 with a plurality of systems 132 and an interior 134. Examples of high-level systems 132 include one or more of a propulsion system 136, an electrical system 138, a hydraulic system 140, and an environmental system 142. Any number of other systems may be included. Although an aerospace example is shown, the principles of the disclosure may be applied to other industries, such as the marine and automotive industries.

Systems and methods embodied herein may be employed during any one or more of the stages of the production and service method 112. For example, components or subassemblies corresponding to production process 120 may be fabricated or manufactured in a manner similar to components or subassemblies produced while the aircraft 114 is in service. Also, one or more apparatus embodiments, method embodiments, or a combination thereof may be utilized during the production stages 120 and 122, for example, by substantially expediting assembly of or reducing the cost of an aircraft 114. Similarly, one or more of apparatus embodiments, method embodiments, or a combination thereof may be utilized while the aircraft 114 is in service, for example and without limitation, to maintenance and service 128.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A portable curing station, comprising:
   a movable cart;
   a mandrel on the movable cart for supporting a composite resin part layup thereon;
   a heating system on the movable cart for heating the mandrel, wherein the heating system is separated into at least two zones;
   an air circulation system on the movable cart for circulating air through the mandrel, wherein the air circulation system includes a serpentine baffle system inside the mandrel for channeling air flow through the mandrel, wherein the air circulation system is separated into the at least two zones; and
   a programmed controller on the movable cart for automatically controlling the heating system and the air circulation system, wherein heating within each zone and airflow within each zone are separately controllable by the programmed controller.

2. The portable curing station of claim 1, further comprising:
   a compaction device for compacting the part layup; and
   wherein the programmed controller controls the air circulation system.

3. The portable curing station of claim 2, wherein the air circulation system includes:
   at least one air blower for forcing airflow over the heating system and through the serpentine baffle system inside the mandrel.

4. The portable curing station of claim 3, wherein:
   the serpentine baffle system defines a plurality of air flow channels inside the mandrel; and
   the heating system comprises a plurality of resistive heating elements substantially spanning the plurality of air flow channels, each of the plurality of resistive heating elements being disposed within a separate one of the plurality of air flow channels.

5. The portable curing station of claim 1, wherein:
the movable cart includes a base, and
the mandrel is removably mounted on the base.

6. The portable curing station of claim 1, wherein:
the mandrel includes a substantially open interior,
the movable cart includes a mounting plate, and
the heating system includes electric heating elements mounted on the mounting plate and disposed within the open interior of the mandrel.

7. The portable curing station of claim 1, further comprising:
at least one shield on the movable cart, the shield being movable from a standby position allowing access to the mandrel, to an operative position shielding the mandrel against access; and
an interlock on the movable cart for sensing the position of the shield and for delivering a signal to the programmed controller indicative of the position of the shield.

8. The portable curing station of claim 1, wherein:
the programmed controller independently controls a temperature within the at least two zones by independently controlling an amount of electrical current supplied to the resistive heating elements in the at least two zones and independently controlling the airflow through the at least two zones.

9. Apparatus for fabricating a composite resin part, comprising:
a movable cart;
a mandrel on which composite resin plies may be laid up and cured, the mandrel being mounted on the movable cart;
a heating system on the movable cart for heating the mandrel;
an air circulation system on the movable cart for circulating air through the mandrel, wherein the air circulation system includes a serpentine baffle system inside the mandrel for channeling air flow through the mandrel;
a programmed controller for automatically controlling the operation of the heating system and the air circulation system; and
a compaction device for compacting the composite resin plies.

10. The apparatus of claim 9, wherein the movable cart includes a set of wheels allowing rolling movement of the movable cart over a floor.

11. The apparatus of claim 9, wherein the mandrel includes:
a tool shell having a substantially open interior, and
a tool base on which the tool shell is removably mounted.

12. The apparatus of claim 11, wherein:
the heating system includes electric heating elements mounted on the base and disposed within the open interior of the tool shell.

13. The apparatus of claim 11, wherein the serpentine baffle system includes baffle plates forming the air flow channels within the open interior of the tool shell for channeling a flow of air through the open interior of the tool shell.

14. The apparatus of claim 13, wherein:
the heating system includes electric heating elements disposed within the air flow channels.

15. The apparatus of claim 9, wherein the mandrel includes a substantially open interior though which air may flow, and the air circulation system includes:
at least one air blower,
an air supply duct coupled between the air blower and the mandrel for supplying air to the open interior of the mandrel, and
an air return duct coupled between the air blower and the mandrel for returning air from the open interior of the mandrel to the blower.

16. The apparatus of claim 9, wherein:
the mandrel includes a substantially open interior divided into first and second heating zones separated from each other,
the heating system includes first and second sets of electric heating elements each coupled with and individually controlled by the programmed controller, and
the air circulation system includes first and second air blowers for respectively blowing air through the first and second heating zones over the first and second sets of heating elements.

* * * * *